United States Patent
Lee et al.

(10) Patent No.: US 8,440,247 B2
(45) Date of Patent: May 14, 2013

(54) METHOD OF FLAVORING TEAS USING WOOD, AND FLAVORED TEAS PREPARED THEREBY

(75) Inventors: Bum Jin Lee, Seoul (KR); Yu Jin Oh, Seongnam-si (KR); Jin Oh Chung, Seongnam-si (KR); Sang Jun Lee, Seongnam-si (KR)

(73) Assignee: Amorepacific Corporation, Seoul (KR)

( * ) Notice: Subject to any disclaimer, the term of this patent is extended or adjusted under 35 U.S.C. 154(b) by 0 days.

(21) Appl. No.: 13/508,835

(22) PCT Filed: Nov. 9, 2010

(86) PCT No.: PCT/KR2010/007879
§ 371 (c)(1),
(2), (4) Date: May 9, 2012

(87) PCT Pub. No.: WO2011/056049
PCT Pub. Date: May 12, 2011

(65) Prior Publication Data
US 2012/0231146 A1    Sep. 13, 2012

(30) Foreign Application Priority Data
Nov. 9, 2009    (KR) .................. 10-2009-0107573

(51) Int. Cl.
    *A23F 3/40*    (2006.01)
(52) U.S. Cl.
    USPC .......................................... 426/597; 426/419

(58) Field of Classification Search .................. 426/597, 426/419
See application file for complete search history.

(56) References Cited

U.S. PATENT DOCUMENTS
6,287,614 B1 *  9/2001  Peiffer .......................... 426/237

FOREIGN PATENT DOCUMENTS

| JP | 2007-289155 | * 11/2007 |
|---|---|---|
| JP | 2009-159861 | * 7/2009 |
| KR | 10-0152731 | 10/1998 |
| KR | 10-0395873 | 8/2003 |
| KR | 10-0623991 | 9/2006 |
| KR | 10-0863818 | 10/2008 |

OTHER PUBLICATIONS

Peet's Coffee. Lapsan Souchong. 2006. http://web.archive.org/web/20070223214141/http://www.peets.com/shop/tea_detail.asp?rdir=1&id=65&cid=200.*
English Translation of JP 2007-289155, published Nov. 2007.*
International Search Report for PCT/KR2010/007879, mailed Jul. 26, 2011.
KR Language Written Opinion of the International Searching Authority for PCT/KR2010/007879, mailed Jul. 26, 2011.

* cited by examiner

*Primary Examiner* — Anthony Weier
(74) *Attorney, Agent, or Firm* — Nixon & Vanderhye P.C.

(57) ABSTRACT

The present invention relates to a method for preparing flavored teas by using wood, and flavored teas prepared thereby. More specifically, the present invention relates to a preparation method of flavored teas with excellent palatability and flavors in which the method uses natural wood along with the appropriate flavoring time and temperature settings, and flavored teas prepared thereby.

8 Claims, 14 Drawing Sheets

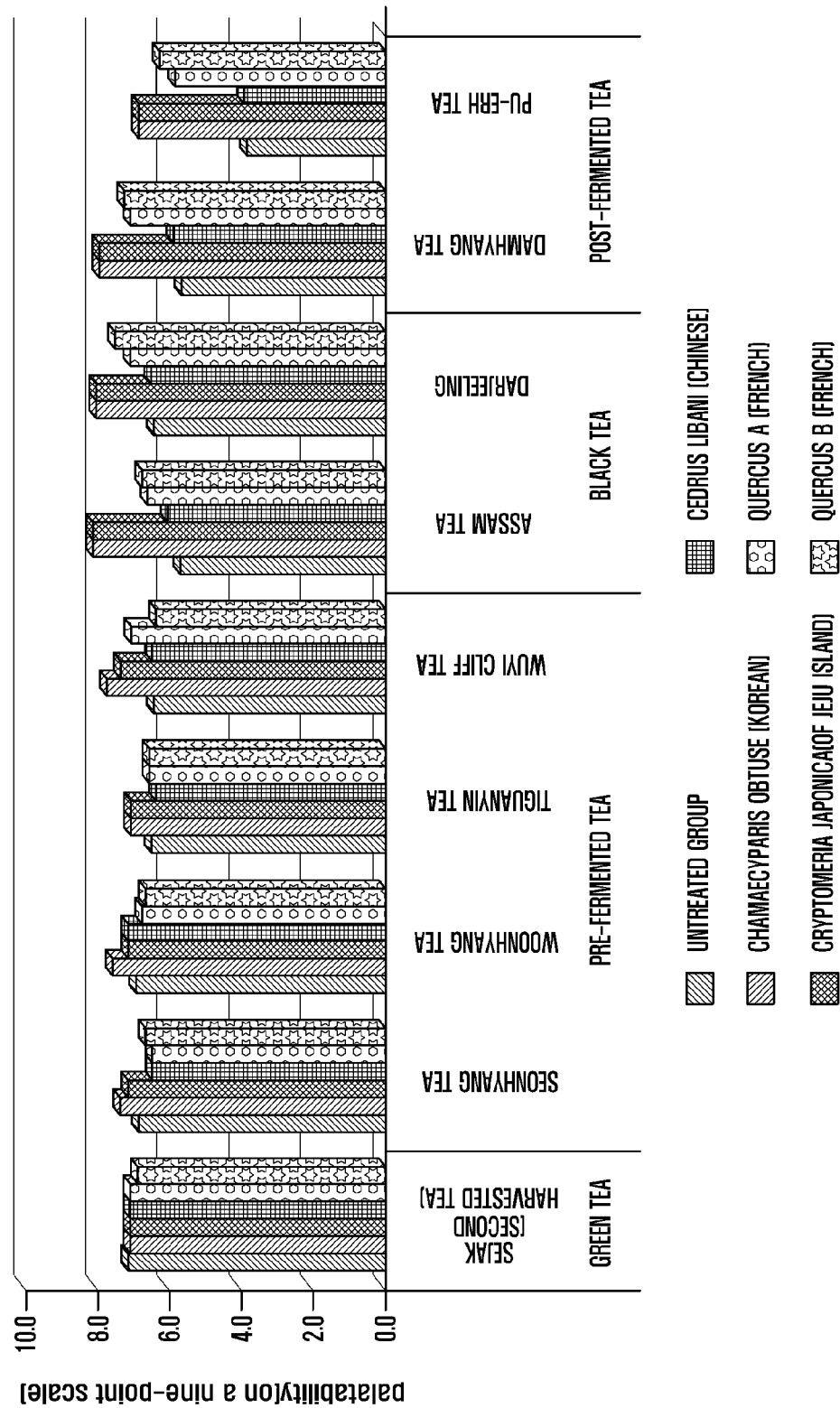

US 8,440,247 B2

METHOD OF FLAVORING TEAS USING WOOD, AND FLAVORED TEAS PREPARED THEREBY

This application is the U.S. national phase of International Application No. PCT/KR2010/007879, filed 9 Nov. 2010, which designated the U.S. and claims priority to Korean Application No. 10-2009-0107573, filed 9 Nov. 2009, the entire contents of each of which are hereby incorporated by reference.

TECHNICAL FIELD

The present invention relates to a method for preparing flavored teas by using wood, and flavored teas prepared thereby, and more particularly, to a method for preparing flavored teas and flavored teas prepared thereby wherein various natural wood is used to apply given flavors to tea materials, at appropriate temperatures for an appropriate period of flavoring time, thereby providing the flavored teas with excellent palatability and flavors.

BACKGROUND ART

From old times, many endeavors have been made over the world to improve the palatability of fermented and seasoned food and to apply the inherent flavors of the food to the food. Among them, the fermenting and seasoning process using *Quercus* used mainly in a wine-making process is most popular. With the inherent flavor of *Quercus* itself and the flavor generated from a toasting process in which *Quercus* is directly heated, the flavor of the wine is more improved. Until now, however, there has been no method for applying natural flavoring and seasoning technology to teas by using wood.

DISCLOSURE

Technical Problem

Therefore, the inventors have studied to develop a method for manufacturing flavored teas by using wood having excellent palatability so as to provide the flavored teas with excellent palatability and flavors, and they have developed a method for manufacturing flavored teas by using wood, in which given teas are flavored at appropriate temperatures for an appropriate period of flavoring time, thereby providing the flavored teas with excellent palatability and flavors.

It is an object of the present invention to provide a method for preparing flavored teas by using wood, through which the flavored teas have excellent palatability and flavors.

Technical Solution

To accomplish the above object, according to the present invention, there is provided a method for preparing flavored teas by using wood, including the steps of: saturating a sealed space with natural wood flavors; and positioning a given tea in the sealed space so as to apply the natural wood flavors to the given tea.

Advantageous Effect

According to the present invention, the method for preparing flavored teas by using wood has a flavoring process and a seasoning process conducted with various kinds of wood, thereby providing the flavored teas with excellent palatability and flavors.

DESCRIPTION OF DRAWINGS

FIG. 14 is a graph showing the investigation results of palatability of flavored teas according to tea materials and wood casings.

BEST MODE FOR INVENTION

Figure 1:
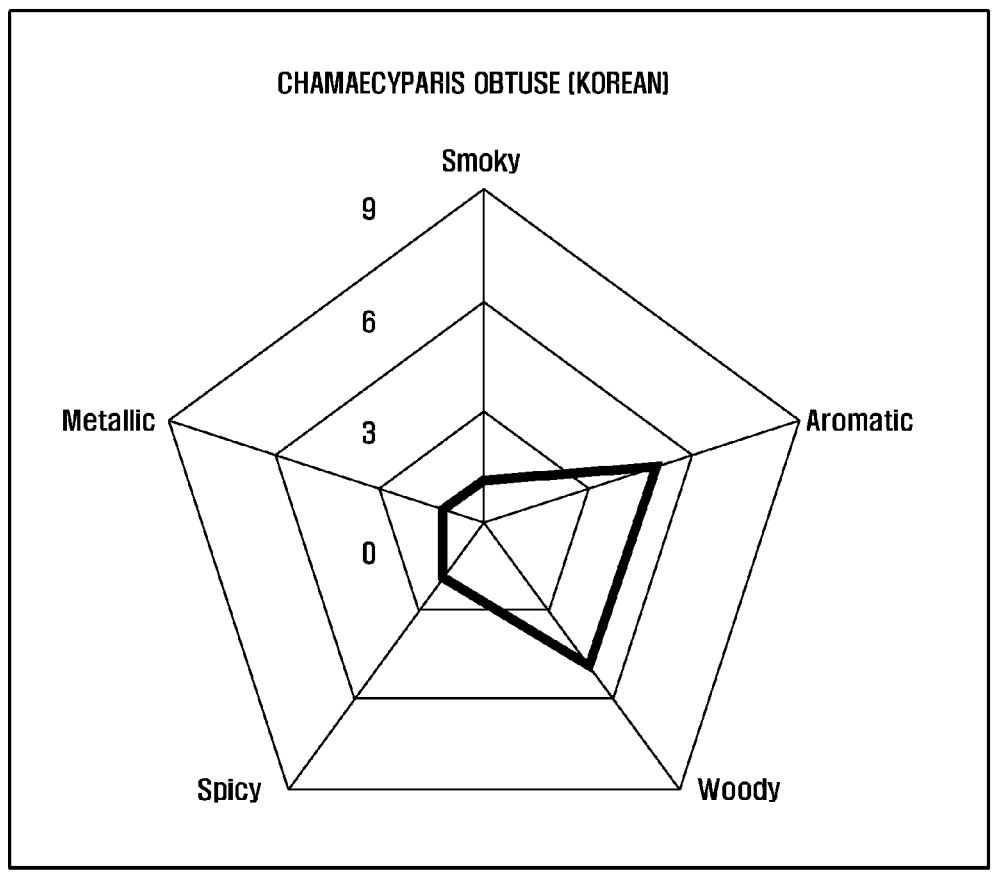
FIGS. 1 to 9 are graphs showing in the evaluation results of the five flavors generated from wood casings made of nine kinds of wood.
Figure 2:
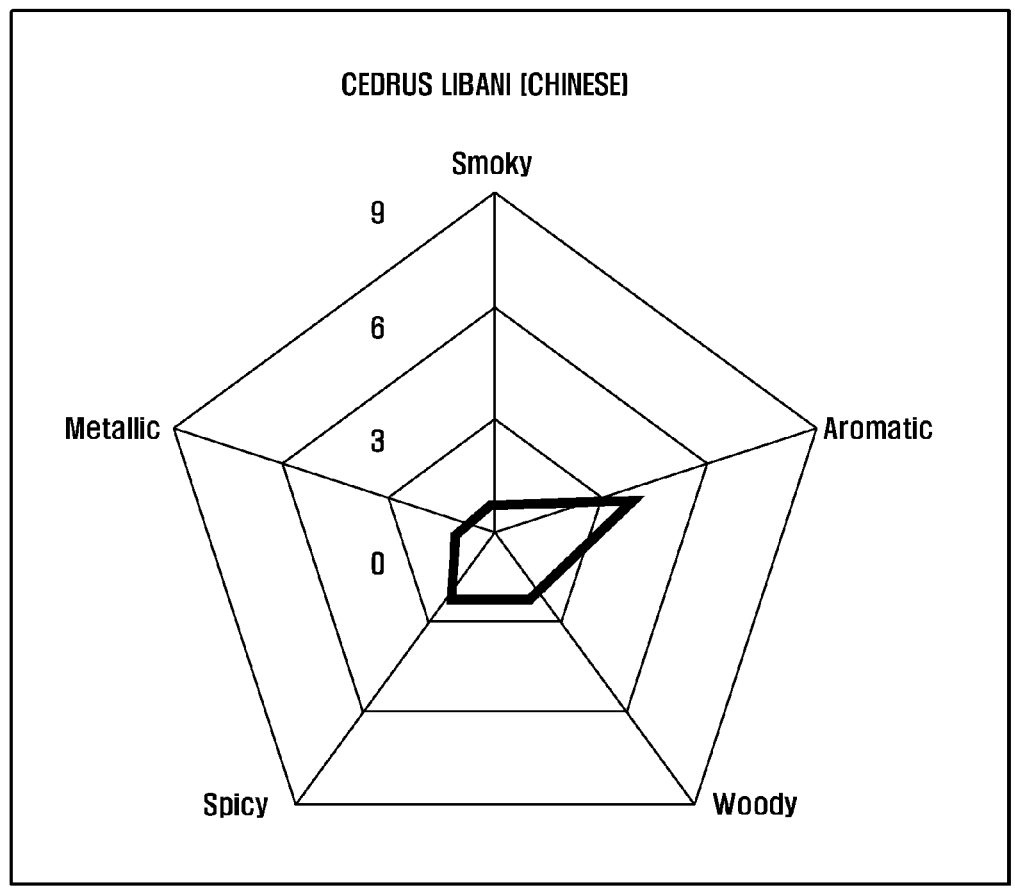
Figure 3:
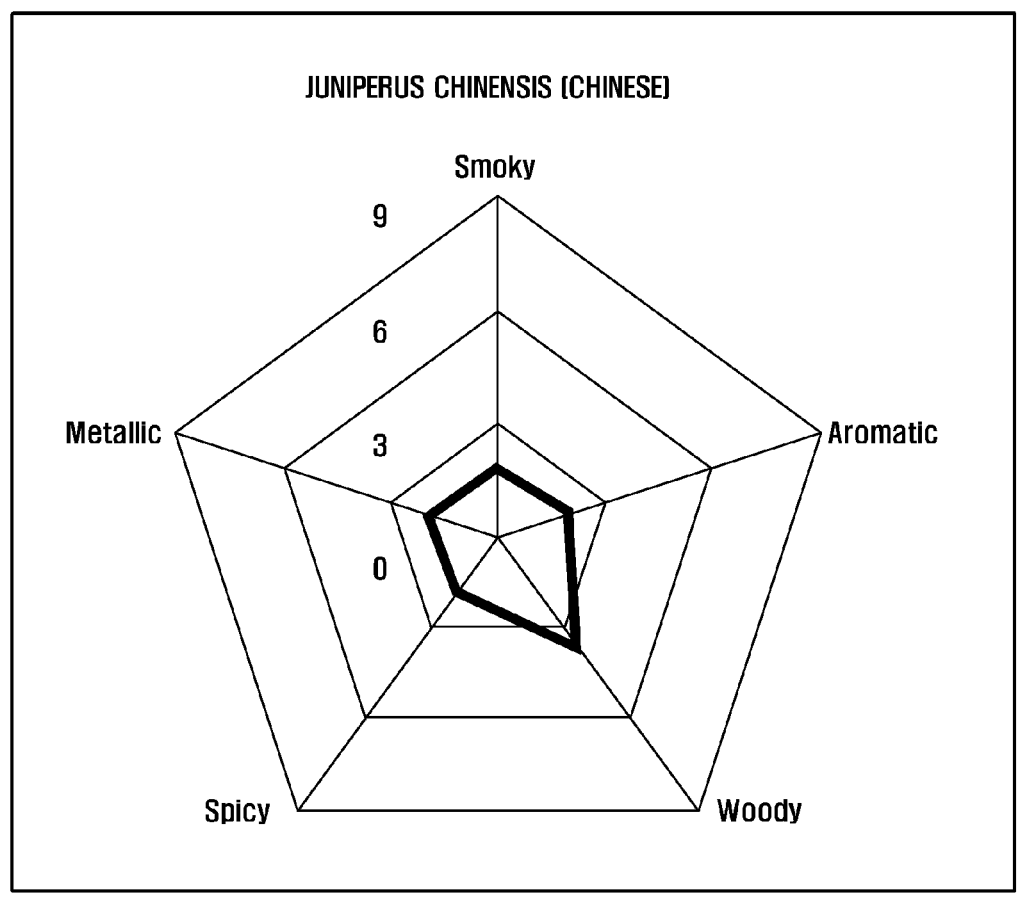
Figure 4:
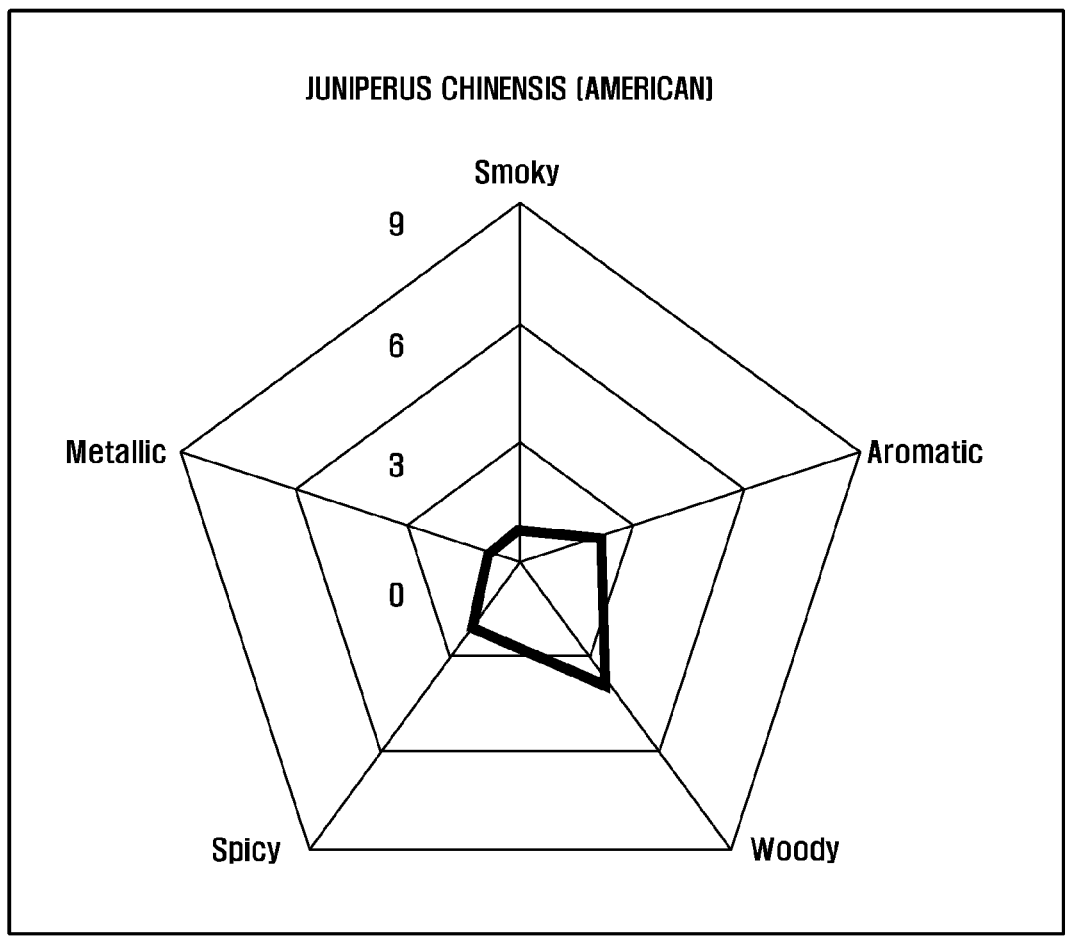
Figure 5:
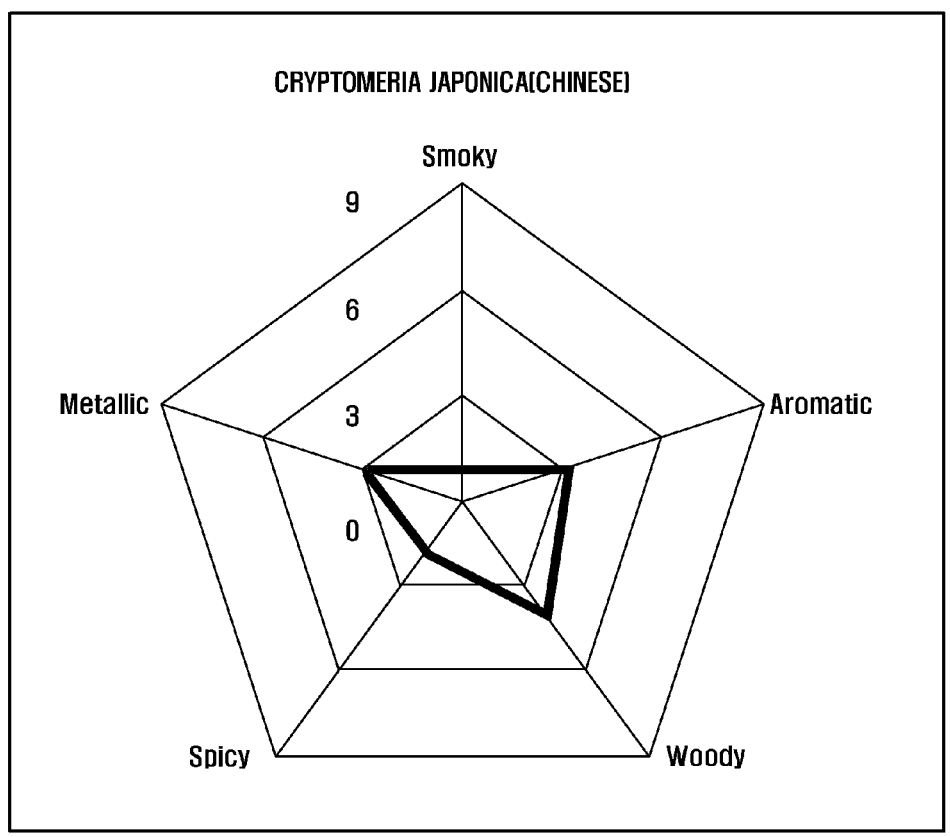
Figure 6:
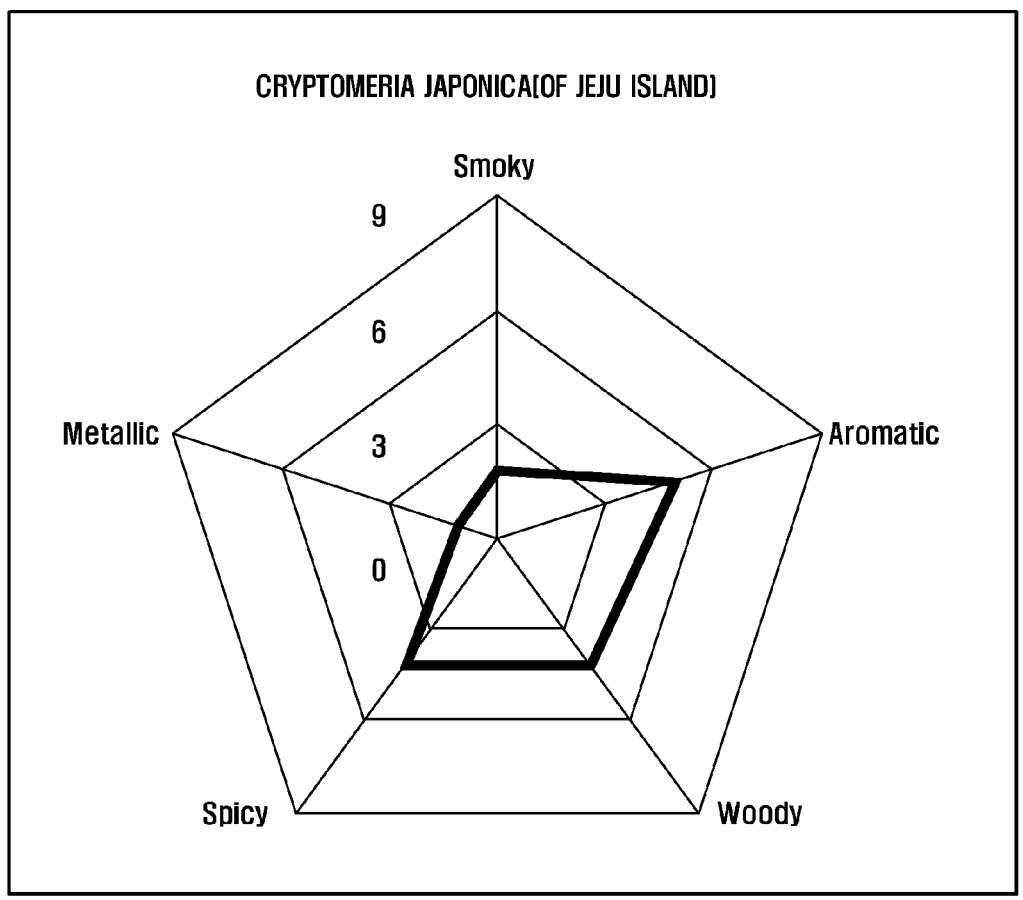
Figure 7:
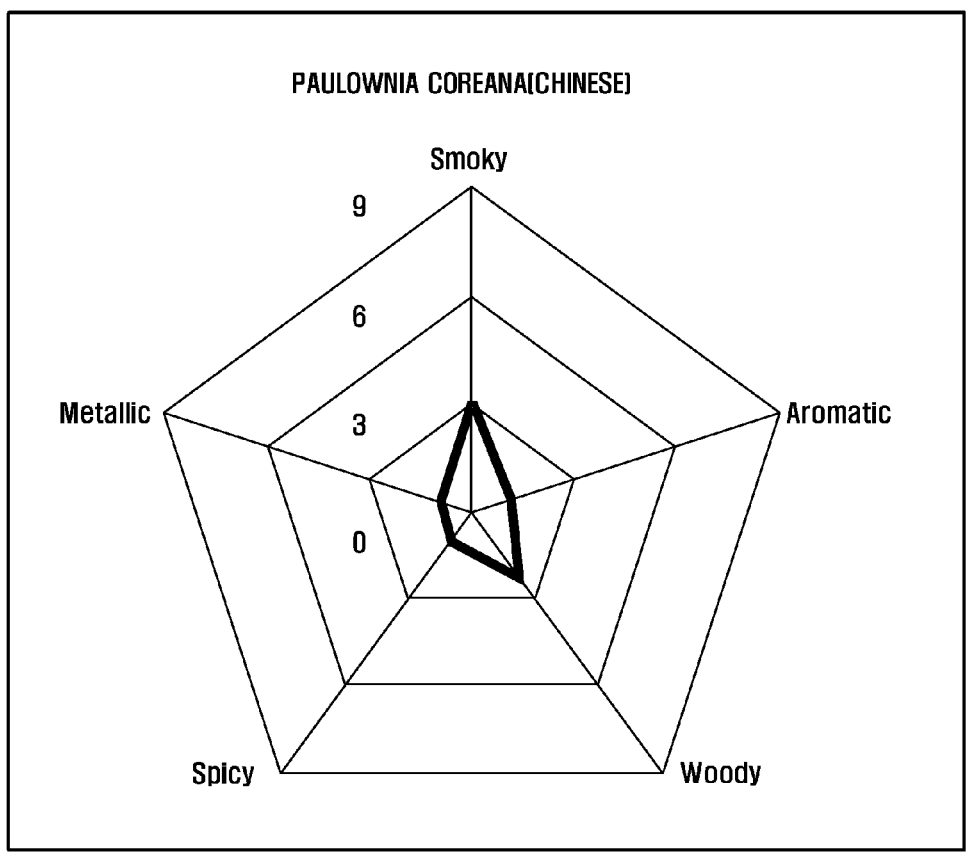
Figure 8:
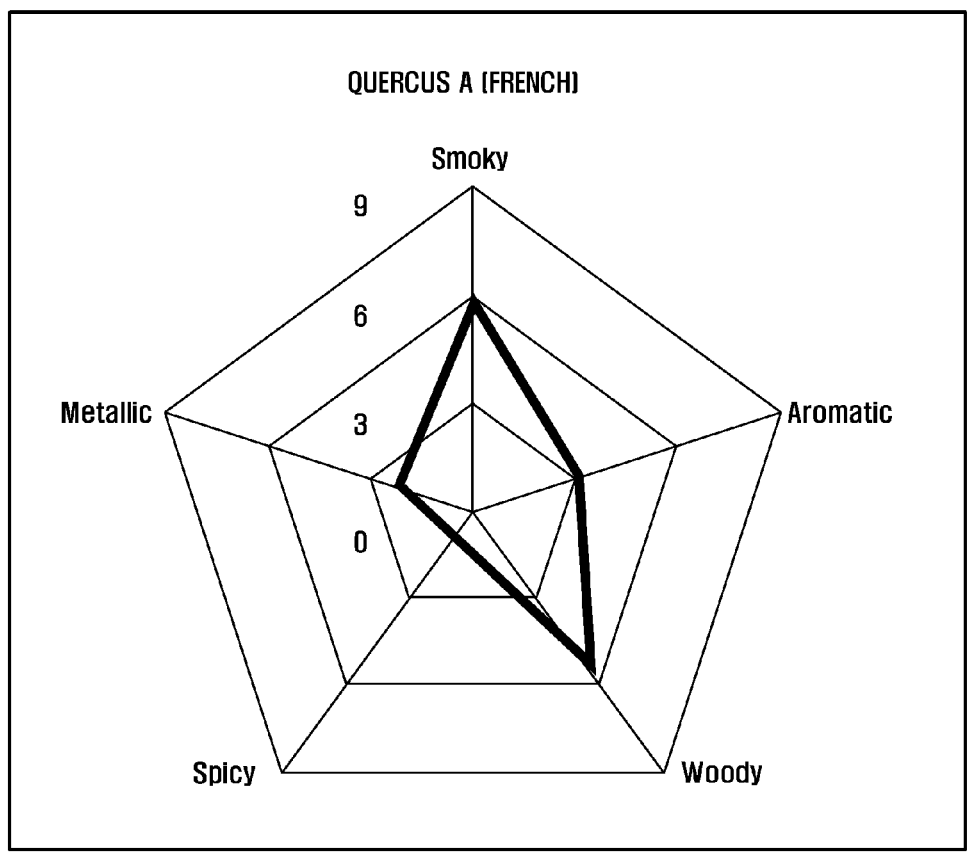
Figure 9:
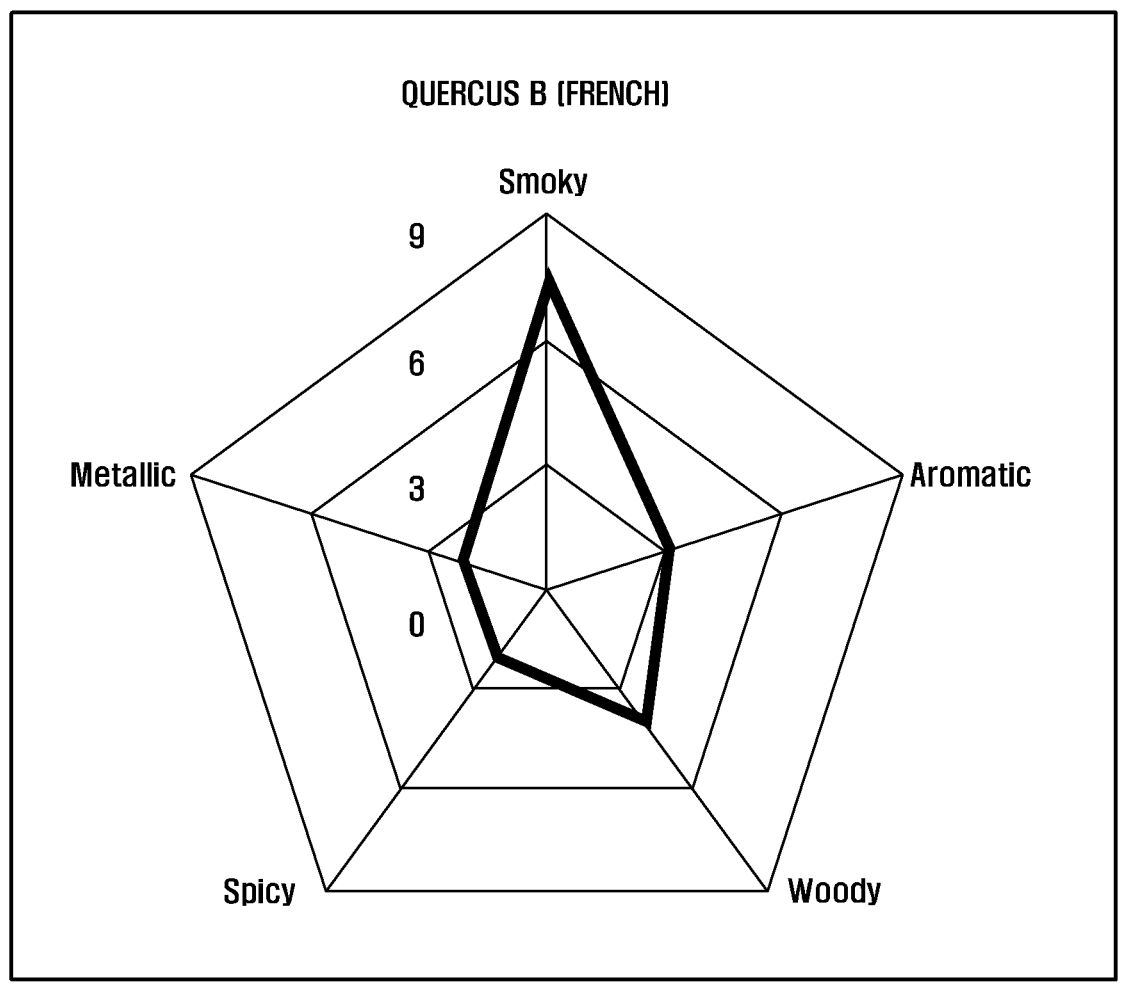

Hereinafter, an explanation on a method for preparing flavored teas by using wood according to the present invention will be given in detail with reference to the attached drawings.

The method for preparing flavored teas by using wood according to the present invention includes the steps of: saturating a sealed space with natural wood flavors; and positioning a given tea in the sealed space so as to apply the natural wood flavors to the given tea. The saturating step and the flavoring step are at the same time or sequentially carried out.

The sealed space is formed by means of, for example, a stainless steel casing and a casing (wood casing) made of natural wood.

In the case where the sealed space is formed by means of the stainless steel casing, natural wood chips are put into the stainless steel casing, thereby allowing the interior of the casing to be saturated with the flavors of the natural wood chips.

In addition, in the case where the sealed space is formed by means of the natural wood casing, the casing is saturated with the flavors of the natural wood by themselves, and natural wood chips may further be put into the natural wood casing with tea, thereby allowing the interior of the casing to be saturated with the flavors of the natural wood chips.

At this time, so as to prevent the flavors of the natural wood saturated in the interior of the stainless steel casing or the natural wood casing from being emitted to the outside, the casing itself is formed of a sealed casing, and alternatively, the casing is sealable by means of a sealing material like Parafilm.

Further, the natural wood constituting the wood casing or the wood chips can be made of any kinds of wood, only if it enhances the flavors of teas, and for example, the natural wood is one or more species selected from the group consisting of *Chamaecyparis obtusa, Cedrus libani, Juniperus chinensis, Cryptomeria japonica, Paulownia coreana*, and *Quercus*.

*Chamaecyparis obtusa* is a species of Cypress, and it is a slow-growing tree which grows to 40 m tall with a trunk up to 2 m in diameter with a broadly conical crown that spreads horizontally. The bark is dark red-brown, filamented, and is very stringy vertically. The leaves are arranged in opposite pairs, and they are thick and have scale-like shapes having a length of 1 to 1.5 mm, with a Y-shaped white stomatal band at the base of each scale-leaf. Also, one line is formed on the surface of each leaf and a white spot is formed on the underside thereof. The cones are globose, have 10-12 mm in diameter, and red-brown, with 8-12 cone scales. Each cone scale has 2 seeds. Each seed has a length of 3 mm and 2 pockets, with small wings. It is an endemic species of Japan and is good in quality, so that it is cultivated in the South of Korea, as the tree species for plantation.

*Cedrus libani* is a species of Pinaceae, which is mentioned in the Bible, especially in the Old Testament. It is recorded that it manly grows in the mountains in Levanon. It often means power, glory, and luxury.

*Juniperus chinensis* is a species of Cupressaceae, and it reaches about 20 m tall, and newly spreading branches are green, three-year old branches black-brown, and seven or eight-year old branches have scale shaped leaves. The sprouts have sharp needles on the leaves. The leaves are twisted and bushy. The wood is used as aroma materials. It grows in deep mountains, especially, at the island Ulleng in Korea, but it mostly disappears. It is generally planted as an ornamental tree. The wood is mostly used for making pencils, and additionally, it is used for sculpture, furniture, and decoration materials. It is distributed in Korea, Japan, China and Mongol.

*Cryptomeria japonica* is a species of Taxodiaceae, which is well grown on the valleys in annual temperature averages between 12° C. and 14° C. and annual rainfall averages of 3,000 mm. It is an endemic species of Japan. It reaches 40 m tall and 1 to 2 m in diameter. The barks are reddish brown, and split vertically, and the branches and leaves are dense to have a conical tree performance. The leaves take bent needle-like shapes and are spirally arranged, and even though they are dried, they are not dropped. It has various variations in accordance with the colors of the barks, the splited state of the barks, the tree performances, the angles of the branches, the colors, shapes, lengths, and bending degrees of the leaves, and glowing areas. It is divided into the species for gardens and the species for forest building, and since the age of tree is very long, the many kinds of tree have a variety of legends. Big and old trees are used as wood.

*Paulownia coreana* is a species of Scrophulariaceae, and reaches 15 m tall. The leaves are arranged in opposite pairs and have heart-like shapes, with sharp tips. The flowers are produced on May to June in spring, and the fruit is a dry egg-shaped capsule with a length of 3 cm. It is sharp in the tip, with no hairs and is matured on October. The wood is used for making cabinets, boxes, musical instruments, and the like, and the tree is the endemic species of Korea, especially growing at the south Pyongan in North Korea and at the south Gyeonggi in South Korea.

*Quercus* is a species of *Quercus Sessilis Pedunculat*, which is a leaf tree or an evergreen tall tree. Sometimes, it is a shrub. The tree is a total name involved in one genus, but it often means *Quercus acutissima*. Starch is obtained from acorns as fruits to make acorn curd for eating. Especially, the fruits are good food for mountain animals like boars. The barks contain a large quantity of tannin, which are used for dyeing fishnets. Since the wood is very hard, it is used in a variety of purposes, especially for making a barrel. The *Quercus* means good wood in Celtic languages, and it also means rear wood in Korean language. *Quercus dentata* Thunberg has large, thick and fragrant leaves, which are used for steaming rice cake. In Japan, they are used for wrapping rice cake. Cork is obtained in Cork Oak, and in warm temperature forest areas, *Quercus suber* produced in Mediterranean Sea is cultivated as economical resources of producing corks.

The natural wood that is available in the preferred embodiment of the present invention is not limited to the above-noted wood, but it is selected easily from the commercial natural wood or is taken directly in well-known typical manners.

The given tea is placed in the sealed space for the purpose of performing the application of the natural wood flavors to the given tea. The tea may be placed in the sealed space on the saturating step of the natural wood flavors or after the saturating step thereof.

The kinds of teas that are available in the preferred embodiment of the present invention are any kinds of commercial teas, for example, green tea, pre-fermented teas like Seonhyang tea, Woonhyang tea, Tieguanyin tea and Wuyi cliff tea, black teas like Assam tea and Darjeeling tea, and post-fermented teas like Damhyang tea and Pu-Erh tea.

The step of saturating the sealed space with the natural wood flavors or the step of positioning the given tea in the sealed space so as to apply the natural wood flavors to the given tea is performed at an appropriate temperature and for an appropriate period of time, so that the natural wood flavors are sufficiently saturated in the sealed space and the flavoring efficiency is enhanced to obtain the teas having excellent flavors. For example, the saturating step or the flavoring step is carried out in the temperature range between about 4° C. and 50° C. for about 7 to 180 days, and desirably in the temperature range between about 15° C. and 40° C. for about 30 to 180 days.

According to the present invention, the method further includes the step of heating the flavored teas after the flavoring step so as to fix the flavors and obtain well balanced flavors. The heating step is carried out in the temperature range between about 30° C. and 80° C. for about 5 to 120 minutes.

MODE FOR INVENTION

Hereinafter, an explanation on the method for preparing flavored teas by using wood according to the present invention will be given in detail with reference to the embodiment of the present invention and the experimental examples. While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

<Preparation of Natural Wood>

Wood consisting of nine kinds of *Chamaecyparis obtusa*, *Cedrus libani*, *Juniperus chinensis* (Chinese and American), *Cryptomeria japonica* (Chinese and of Jeju in Korea), *Paulownia coreana*, and *Quercus* A and B (French) was prepared from commercial wood wholesalers and wood processing places by district and was made as square wood casings having the internal surface areas of 2400 cm$^2$, 5400 cm$^2$, 9600 cm$^2$ and 15000 cm$^2$.

The wood chips were used with ones generated during the manufacturing of the wood casings.

<Preparation of Material Teas>

The present invention made use of various kinds of teas being sold in the market. Green tea was used with Sulloc Sejak tea made by Amore Pacific, pre-fermented teas were used as Sulloc Seonhyang and Woonhyang teas made by Amore Pacific, Tieguanyin tea and Wuyi cliff tea imported from China, and black teas were used as Assam tea and Darjeeling tea produced from India. Lastly, post-fermented teas were used as Sulloc Damhyang tea made by Amore Pacific and Pu-Erh tea in China.

Such prepared teas were heated in the temperature range between 50° C. and 120° C. for 5 to 60 minutes so as to remove a nasty smell therefrom and then used as the material teas for applying flavors thereto.

Embodiment 1

Preparation of Flavored Teas Using Wood Casings

The above-mentioned various kinds of teas were put into the square wood casings having the internal surface areas of 2400 cm$^2$, 5400 cm$^2$, 9600 cm$^2$ and 15000 cm$^2$, and the wood casings were sealed. After that, the teas were left in the temperature range between 4° C. and 50° C. for 7 to 180 days so as to perform seasoning and flavoring. After finishing the natural flavoring, the teas were heated in the temperature range between 30° C. and 80° C. for 5 to 120 minutes to fix the flavors thereto, thereby completing preparing the flavored teas.

Embodiment 2

Preparation of Flavored Teas Using Wood Chips

The above-mentioned various kinds of teas and wood chips were put into the square stainless steel casings having the internal surface areas of 2400 cm², 5400 cm², 9600 cm² and 15000 cm², and the stainless steel casings were sealed. After that, the teas were left in the temperature range between 4° C. and 50° C. for 7 to 180 days so as to perform seasoning and flavoring. After finishing the natural flavoring, the teas were heated in the temperature range between 30° C. and 80° C. for 5 to 120 minutes to fix the flavors thereto, thereby completing preparing the flavored teas.

Embodiment 3

Preparation of Flavored Teas Using Wood Casings and Wood Chips

The above-mentioned various kinds of teas and wood chips were put into the square wood casings having the internal surface areas of 2400 cm², 5400 cm², 9600 cm² and 15000 cm², and the wood casings were sealed. After that, the teas were left in the temperature range between 4° C. and 50° C. for 7 to 180 days so as to perform seasoning and flavoring. After finishing the natural flavoring, the teas were heated in the temperature range between 30° C. and 80° C. for 5 to 120 minutes to fix the flavors thereto, thereby completing preparing the flavored teas.

Experimental Example 1

Setting of Conditions for Natural Flavoring

So as to set the conditions for the natural flavoring in the preparing processes of the flavored teas according to the Embodiment 1 of the present invention, panel tests were conducted to check the palatability and flavors of the natural flavored teas in accordance with temperatures, days, and the kinds of material teas, through the panel composed of ten experts. The test methods were carried out wherein each expert answered given items with a 9-point scale. According to the test results, the higher the estimated point was, the greater the degree of satisfaction to the palatability and flavors was.

<Investigation on Palatability of Flavors of Wood for Selection of Natural Wood>

Representative five items, that is, smoky, aromatic, woody, spicy and metallic flavors, as the wood flavors of the wood casings consisting of nine kinds of *Chamaecyparis obtusa*, *Cedrus libani*, *Juniperus chinensis* (Chinese and American), *Cryptomeria japonica* (Chinese and of Jeju in Korea), *Paulownia coreana*, and *Quercus* A and B (French) were estimated with the 9-point scale, and the estimated results were listed in FIGS. 1 to 9.

It was found from the graphs in FIGS. 1 to 9 that aromatic flavors were higher in a group of *Chamaecyparis obtusa*, *Cedrus libani*, and *Cryptomeria japonica* (of Jeju in Korea) and the smoky flavors were higher in a group of *Quercus* A and B (French).

Figure 10:
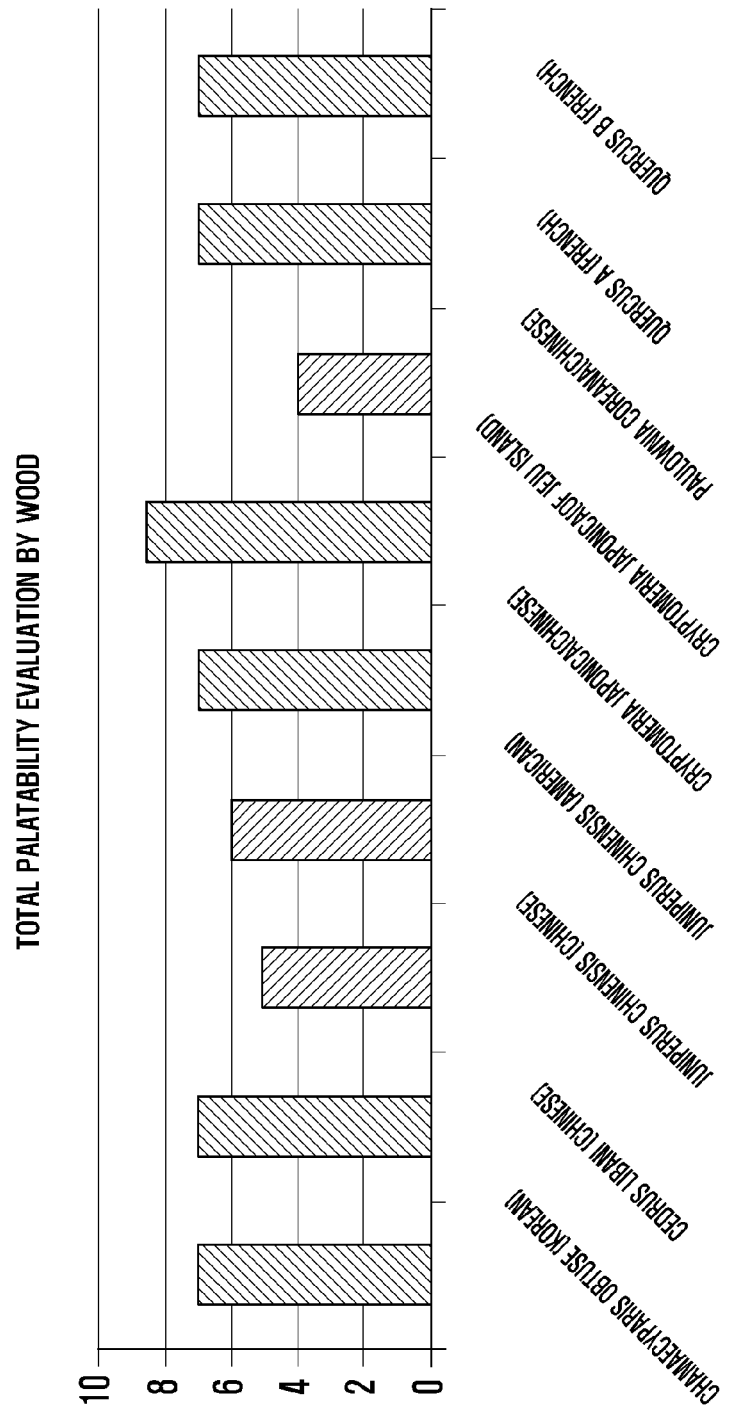
FIG. 10 is a graph showing the investigation results of the palatability of the flavors for the wood casings made of nine kinds of wood.

Further, the total palatability on the wood casings made of nine kinds of wood was estimated and the results were shown in FIG. 10. It was found from the graph in FIG. 10 that *Chamaecyparis obtusa* (Korean), *Cedrus libani* (Chinese), *Cryptomeria japonica* (Chinese and of Jeju in Korea), and *Quercus* A and B (French) obtained the total palatability of more than 7 points, which were very popular to general consumers.

<Investigation on Palatability of Flavors of Wood Casings According to Temperatures>

Wood has different ratios of materials being volatile according to temperatures, and accordingly, the palatability of the flavors being volatile by temperature may be changed. It was investigated whether the flavors were volatile at any temperature, by using the wood casing made of *Cryptomeria japonica* (of Jeju in Korea), and the results were shown in FIG. 11.

Figure 11:
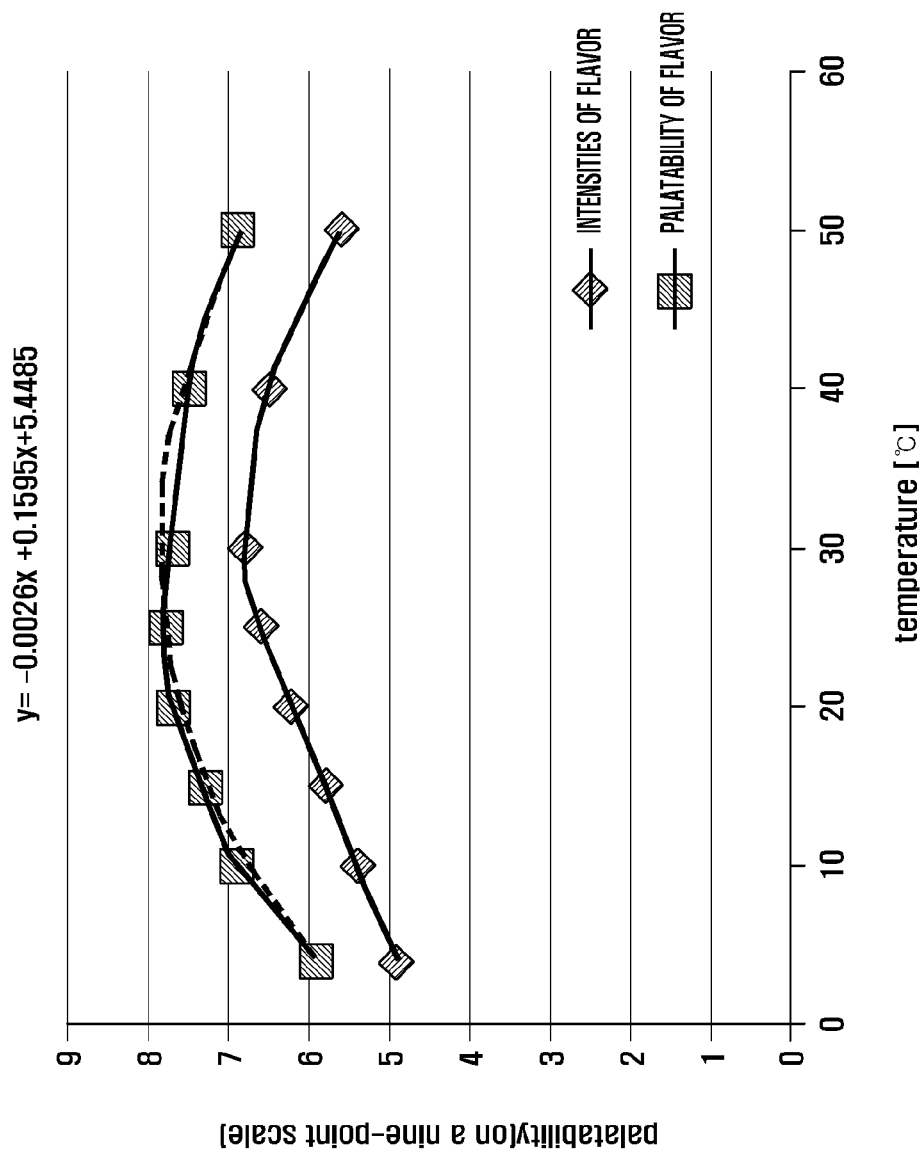
FIG. 11 is a graph showing the intensities of the flavor according to flavoring temperatures.

It was found from the graph in FIG. 11 that *Cryptomeria japonica* flavor was increased as the temperature was raised and was a little decreased at the temperature of 30° C. It was appreciated that the palatability of the flavor is highest in the temperature range between 15° C. and 40° C. Generally, since 7 points or more on the 9-point scale of palatability are considered having palatability, it is concluded that the temperature up to 45° C. does not have any influence on the palatability according to the sensory estimation.

<Relation Between Ratio of Tea Materials and the Internal Surface Areas of Wood Casing and Flavoring Days>

According to the above test results, the test was conducted at the temperature of 25° C. to find the relation between ratio of tea materials and the internal surface areas of the wood casing (made of Jeju *Cryptomeria japonica*) and flavoring days. The various kinds of material teas were put into the sealed casings from which the flavor components are not volatile, and the ratios of the material teas and the internal surface areas of the wood casing were changed.

Figure 12:
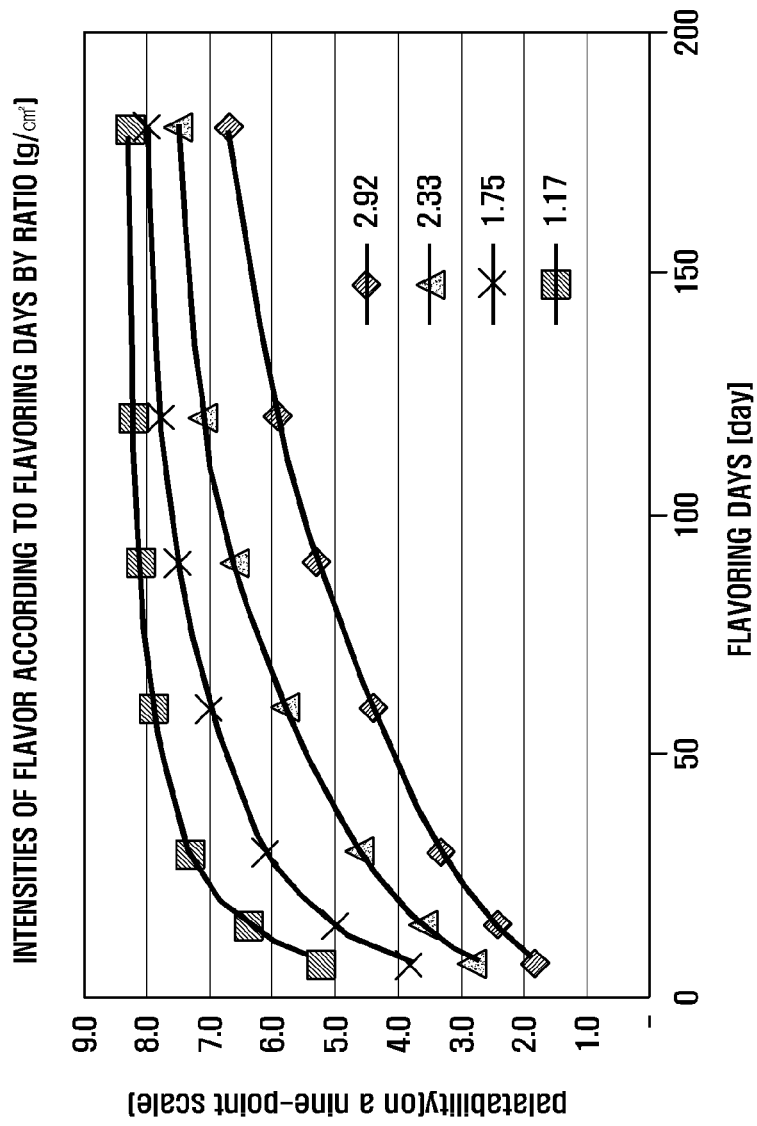
FIG. 12 is a graph showing the variations of the intensities of the flavors according to flavoring days.

First, the intensities of the flavor felt from the flavored tea were checked in accordance with the ratios of the material teas and the internal surface areas of the wood casing, and the results were shown in Table 1 and FIG. 12.

TABLE 1

| Wood casing length | Material | Internal surface area | Ratio (g/ | Flavor intensities by flavoring day | | | | | | |
|---|---|---|---|---|---|---|---|---|---|---|
| (cm) | tea (g) | (cm²) | cm²) | 7 | 15 | 30 | 60 | 90 | 120 | 180 |
| 50 | 43750 | 15000 | 2.92 | 1.8 | 2.4 | 3.3 | 4.4 | 5.3 | 6.2 | 7.3 |
| 40 | 22400 | 9600 | 2.33 | 2.8 | 3.6 | 4.6 | 5.8 | 6.6 | 7.1 | 7.7 |
| 30 | 9450 | 5400 | 1.75 | 3.8 | 5.0 | 6.1 | 7.0 | 7.5 | 7.8 | 8.0 |
| 20 | 2800 | 2400 | 1.17 | 5.2 | 6.4 | 7.3 | 7.9 | 8.1 | 8.2 | 8.3 |

It was found from Table 1 and FIG. 12 that the flavoring in the test group wherein the surface area of the wood contacted with the material tea was large was conducted rapidly, and after about 60 days, the flavor intensities reached the saturated state. However, it was found that in the test group wherein the surface area of the wood contacted with the material tea was small the flavor intensities were continuously increased and the intensities when saturated were strong as the surface area of the wood contacted with the material tea was large.

Experimental Example 2

Investigation of Palatability

Based upon the results of the experimental example 2, the palatability of consumers was estimated on a 9-point scale, and the results were shown in the following Table 2 and FIG. 13.

TABLE 2

| Wood casing length | Material | Internal surface area | Ratio (g/ | Palatability of flavor by flavoring day | | | | | | |
|---|---|---|---|---|---|---|---|---|---|---|
| (cm) | tea (g) | (cm²) | cm²) | 7 | 15 | 30 | 60 | 90 | 120 | 180 |
| 50 | 43750 | 15000 | 2.92 | 4.9 | 5.1 | 5.5 | 6.3 | 7.0 | 7.5 | 8.0 |
| 40 | 22400 | 9600 | 2.33 | 5.7 | 6.0 | 6.4 | 7.2 | 7.8 | 8.0 | 7.8 |
| 30 | 9450 | 5400 | 1.75 | 6.2 | 6.5 | 7.0 | 7.8 | 8.0 | 7.8 | 7.1 |
| 20 | 2800 | 2400 | 1.17 | 6.7 | 7.3 | 7.8 | 7.9 | 7.7 | 7.3 | 6.5 |

Figure 13:
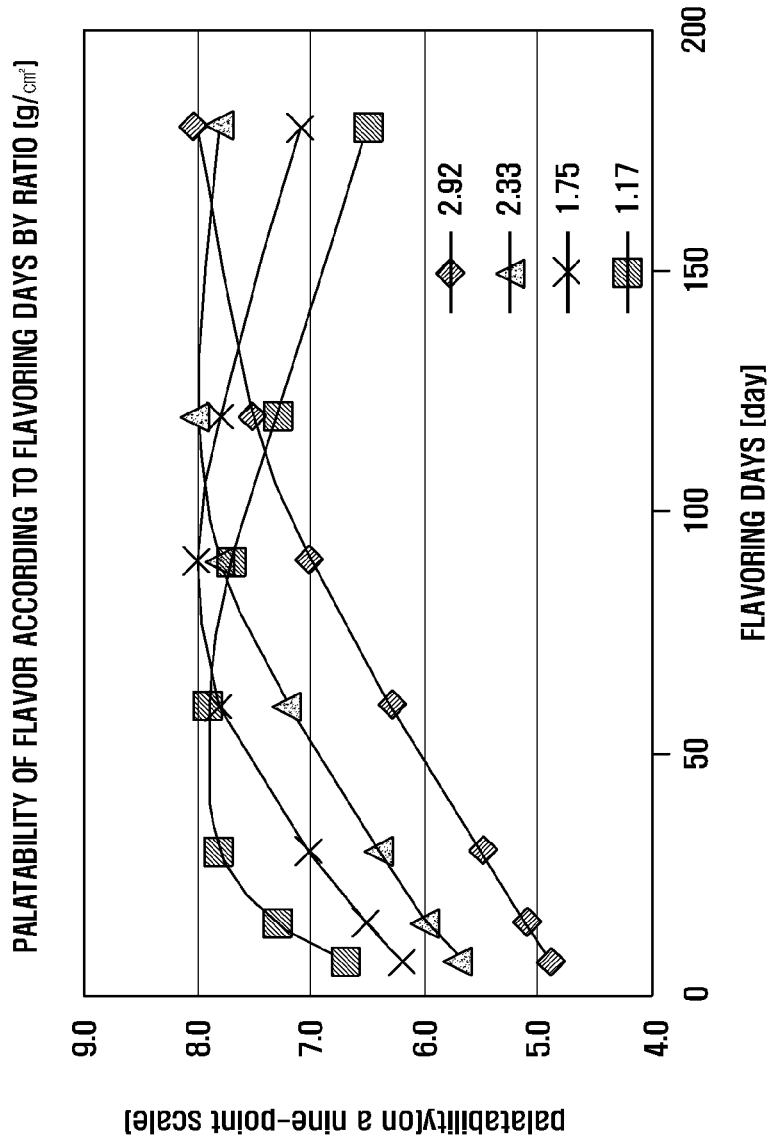
FIG. 13 is a graph showing the variations of the palatability of the flavors according to flavoring days.

It was found from Table 2 and FIG. 13 that the changes of palatability of independent patterns existed irrespective of the intensities of flavor, and in case of the test group wherein the ratio of the green tea and the surface area of the wood casing was 1.17 g/cm$^2$, when the natural flavoring and seasoning were conducted for 7 to 135 days, the palatability of consumers had 7 points or more. Further, it was found that in case of the test group wherein the ratio of the green tea and the surface area of the wood casing was 1.75 g/cm$^2$, 30 to 180 days for the natural flavoring and seasoning were needed, in case of the test group wherein the ratio was 2.33 g/cm$^2$, 50 days or more therefor were needed, and in case of the test group wherein the ratio was 2.92 g/cm$^2$, 90 days or more therefor were needed.

Through such optimizing method, the palatability of the flavored tea obtained by applying the flavor of the wood casing made of *Cryptomeria japonica* (of Jeju) to the material teas having various flavors was investigated, and as a result, it was appreciated that the overall tastes and flavors were differentiated from the existing material teas and the palatability of the flavored teas were improved greatly.

Experimental Example 3

The optimizing tests for other wood except *Cryptomeria japonica* (of Jeju) were conducted in the same manner as the experimental example 2, and the analysis results of palatability of the flavored teas prepared according to various material teas were shown in Table 3 and FIG. 14.

Experimental Example 4

Setting of Natural Flavoring Conditions Using Wood Chips

<Relation Between Ratio of Tea Materials and the Surface Areas of Wood Chips and Flavoring Days>

According to the test results of the experimental example 1, this test was conducted at the temperature of 25° C. to find the relation between ratio of tea materials and the surface areas of the wood chips (made of Jeju *Cryptomeria japonica*) and flavoring days. The various kinds of material teas and wood chips were filled into sealed stainless steel casings having different sizes, and the ratios of the weights of the filled material teas and the surface areas of the wood chips were differently set.

First, the intensities of the flavor felt from the flavored tea were checked in accordance with the ratios of the material teas and the surface areas of the wood chips, and the results were shown in Table 4.

TABLE 3

|  | Pre-fermented teas | | | | | Black teas | | Post-fermented teas | |
| --- | --- | --- | --- | --- | --- | --- | --- | --- | --- |
|  | Green tea | | | | Wuyi | | | | |
| Wood | Sejak | Seonhyang | Woonhyang | Tieguanyin | cliff | Assam | Darjeeling | Damhyang | Pu-Erh |
| Untreated group | 7.1 | 6.8 | 6.9 | 6.5 | 6.3 | 5.7 | 6.3 | 5.6 | 3.8 |
| *Chamaecyparis obtusa* (Korean) | 7.0 | 7.3 | 7.5 | 7.0 | 7.7 | 8.1 | 8.0 | 7.9 | 6.8 |
| *Cryptomeria japonica* (of Jeju) | 7.0 | 7.0 | 7.0 | 7.1 | 7.3 | 8.1 | 8.0 | 7.9 | 6.8 |
| *Cedrus libani* (Chinese) | 7.0 | 6.5 | 7.0 | 6.3 | 6.5 | 6.0 | 6.5 | 5.8 | 4.0 |
| *Quercus* A (French) | 7.0 | 6.5 | 6.7 | 6.5 | 6.1 | 6.6 | 7.2 | 7.0 | 5.8 |
| *Quercus* B (French) | 6.8 | 6.6 | 6.6 | 6.5 | 6.3 | 6.7 | 7.5 | 7.2 | 6.2 |

It was found from Table 3 and FIG. 14 that Sejak tea, which was the representative test group of the green tea, had the palatability of its natural flavor significantly increased, and Seonhyang tea, Woonhyang tea, Tieguanyin tea, and Wuyi cliff tea, which were the pre-fermented teas, had the palatability of their natural flavors increased greatly in *Chamaecyparis obtusa* and *Cryptomeria japonica*. It was further found that black tea, which was complete fermented tea, had the palatability increased greatly in all of *Chamaecyparis obtusa*, *Cryptomeria japonica*, and *Quercus* A and B, and Damhyang tea and Pu-Erh tea, which were the post-fermented teas, had the palatability increased in all kinds of wood, especially increased greatly in *Chamaecyparis obtusa* and *Cryptomeria japonica*.

TABLE 4

| Stainless steel casing length (cm) | Material tea (g) | Wood chips surface area (cm$^2$) | Ratio (g/cm$^2$) | Flavor intensities by flavoring day | | | | | | |
| --- | --- | --- | --- | --- | --- | --- | --- | --- | --- | --- |
|  |  |  |  | 7 | 15 | 30 | 60 | 90 | 120 | 180 |
| 50 | 43750 | 15000 | 2.92 | 1.7 | 2.2 | 3.3 | 4.5 | 5.3 | 6.3 | 7.2 |
| 40 | 22400 | 9600 | 2.33 | 2.6 | 3.5 | 4.7 | 5.7 | 6.5 | 7.1 | 7.6 |
| 30 | 9450 | 5400 | 1.75 | 3.6 | 5.0 | 6.2 | 7.2 | 7.4 | 7.7 | 8.1 |
| 20 | 2800 | 2400 | 1.17 | 5.1 | 6.3 | 7.2 | 7.9 | 8.3 | 8.3 | 8.3 |

It was found from Table 4 that the flavoring in the test group wherein the surface area of the wood contacted with the material tea was large was conducted rapidly, and after about 60 days, the flavor intensities reached the saturated state.

However, it was found that in the test group wherein the surface area of the wood contacted with the material tea was small the flavor intensities were continuously increased and the intensities when saturated were strong as the surface area of the wood contacted with the material tea was large. It was therefore appreciated that the flavoring using the wood casings and the flavoring using the wood chips were very similar to each other.

Experimental Example 5

Relation Between Ratio of Tea Materials and the Surface Areas of Wood Chips and Flavoring Days Based upon the results of the experimental example 4, the palatability of consumers was estimated on a 9-point scale, and the results were shown in the following Table 5.

was small the flavor intensities were continuously increased and the intensities when saturated were strong as the surface area of the wood chips contacted with the material tea was large. It was therefore appreciated that this experimental results were very similar to the results of the experimental example 2.

Experimental Example 6

So as to check whether palatability is increased when the wood flavors were mixed to each other, the materials of the wood casings and the materials of the wood chips mixed thereto were different from each other, and the optimizing tests were conducted in the same manner as the experimental example 2, so that the analysis results of palatability of the flavored teas prepared according to various material teas were shown in Table 6.

TABLE 6

| Casing material + Wood chips material | Pre-fermented teas | | | | Wuyi cliff | Black teas | | Post-fermented teas | |
|---|---|---|---|---|---|---|---|---|---|
| | Green tea Sejak | Seonhyang | Woonhyang | Tieguanyin | | Assam | Darjeeling | Damhyang | Pu-Erh |
| Untreated group | 7.1 | 6.8 | 6.9 | 6.5 | 6.3 | 5.7 | 6.3 | 5.6 | 3.8 |
| *Chamaecyparis obtusa* (of Jeju) + *Cryptomeria japonica* (of Jeju) | 7.0 | 7.2 | 7.5 | 7.0 | 7.7 | 8.1 | 8.0 | 7.9 | 6.8 |
| *Cryptomeria japonica* (of Jeju) + *Chamaecyparis obtusa* (of Jeju) | 7.0 | 7.1 | 7.4 | 7.1 | 7.5 | 8.1 | 8.0 | 7.9 | 6.8 |
| *Quercus* (French) + *Cryptomeria japonica* (of Jeju) | 6.7 | 6.5 | 6.7 | 6.5 | 6.1 | 6.6 | 7.2 | 7.0 | 5.8 |
| *Quercus* (French) + *Chamaecyparis obtusa* (of Jeju) | 6.8 | 6.6 | 6.6 | 6.5 | 6.3 | 6.7 | 7.4 | 7.2 | 6.0 |

TABLE 5

| Stainless steel casing length (cm) | Raw material tea (g) | Wood chips surface area (cm²) | Ratio (g/cm²) | Palatability of flavor by flavoring day | | | | | | |
|---|---|---|---|---|---|---|---|---|---|---|
| | | | | 7 | 15 | 30 | 60 | 90 | 120 | 180 |
| 50 | 43750 | 15000 | 2.92 | 4.7 | 5.0 | 5.5 | 6.2 | 7.1 | 7.4 | 7.9 |
| 40 | 22400 | 9600 | 2.33 | 5.5 | 6.1 | 6.5 | 7.1 | 7.7 | 8.1 | 7.9 |
| 30 | 9450 | 5400 | 1.75 | 6.0 | 6.4 | 7.0 | 7.6 | 8.0 | 7.8 | 7.0 |
| 20 | 2800 | 2400 | 1.17 | 6.5 | 7.1 | 7.8 | 7.9 | 7.9 | 7.6 | 6.8 |

It was found from Table 5 that the flavoring in the test group wherein the surface area of the wood chips contacted with the material tea was large was conducted rapidly, and after about 60 days, the flavor intensities reached the saturated state. However, it was found that in the test group wherein the surface area of the wood chips contacted with the material tea It was found from Table 6 that the analysis results of the palatability through the wood casings and the wood chips did not show a significant difference from each other and the palatability could be increased through the mixed flavors of the two wood materials.

The invention claimed is:

1. A method for preparing flavored teas by using wood, comprising the steps of:
    (1) saturating a sealed space with natural wood flavors; and
    (2) positioning a given tea in the sealed space so as to apply the natural wood flavors to the given tea; and
    (3) heating the flavored tea after the flavoring step;
    wherein the heating step is carried out at a temperature in a range between 30° C.-80° C. for 50 to 120 minutes, and
    wherein the saturating step and the flavoring step are carried out at the same time or are sequentially carried out,
    wherein the saturating step or the flavoring step is carried out at a temperature in a range of between 4° C. and 50° C. for 7 to 180 days, and
    wherein the natural wood is at least one species selected from the group consisting of *Chamaecyparies obtus, Cedrus libani Juniperus chinensis, Chryptomeria japonica, Paulownia coreana*, and *Quercus*.
2. The method for preparing flavored teas according to claim 1, wherein the sealed space is formed in a casing made of natural wood.
3. The method for preparing flavored teas according to claim 1, wherein the sealed space further has wood chips positioned therein.
4. The method for preparing flavored teas according to claim 1, wherein the given tea is one or more teas selected from the group consisting of green teas, pre-fermented teas, black teas, and post-fermented teas.

5. Flavored teas prepared by the method according to claim 1.

6. Flavored teas prepared by the method according to claim 2.

7. Flavored teas prepared by the method according to claim 3.

8. Flavored teas prepared by the method according to claim 4.

* * * * *